United States Patent [19]

LaPorte

[11] 4,311,362
[45] Jan. 19, 1982

[54] TWO-POSITION AERODYNAMIC MIRROR

[76] Inventor: Thomas A. LaPorte, 10705 Nadine, Huntington Woods, Mich. 48070

[21] Appl. No.: 146,035

[22] Filed: May 2, 1980

[51] Int. Cl.³ .............................................. G02B 5/10
[52] U.S. Cl. ................................... 350/293; 350/299; 350/304
[58] Field of Search .............................. 350/279–282, 350/289, 293, 303, 304, 299

[56] References Cited

U.S. PATENT DOCUMENTS

| | | | |
|---|---|---|---|
| 2,330,444 | 9/1943 | Park | 350/304 |
| 4,031,772 | 6/1977 | De Castri | 350/280 |

FOREIGN PATENT DOCUMENTS 2605956  8/1977  Fed. Rep. of Germany ...... 350/280

*Primary Examiner*—F. L. Evans
*Attorney, Agent, or Firm*—Remy J. VanOphem

[57] ABSTRACT

A two-position contoured, externally mounted rear view mirror for automotive vehicles as disclosed. The mirror housing is rotatable between two fixed positions. The mirror housing contains a first relatively large mirror providing a relatively large rearward viewing area for city driving and a second relatively smaller mirror having a reduced rearward viewing area for highway driving. In a first fixed position of the mirror housing, the first mirror is viewable by the operator and in a second fixed position, the second mirror is viewable by the operator. The mirror housing is shaped such that in the second position, the aerodynamic drag of the mirror housing is minimized to improve the high speed efficiency of the vehicle. Alternate embodiments of the invention include convex portions for the mirror to increase the rearward field of view.

9 Claims, 9 Drawing Figures

TWO-POSITION AERODYNAMIC MIRROR

BACKGROUND OF THE INVENTION

1. Field of the Invention

The invention is related to the field of rear view mirrors for automotive vehicles, and in particular, to a rear view mirror rotatable between a first position for highway use and a second position for city use.

2. Description of the Prior Art

Modern day automotive vehicles are aerodynamically designed to reduce their high speed wind drag as much as possible. This not only improves the handling of the vehicle at high speeds, but also reduces the power required to sustain high speed operation of the vehicle. In these days of fuel shortages and the attendant increased fuel costs, serious efforts are being made to keep the vehicles as aerodynamically clean as possible. In addition to the overall configuration of the vehicle, additional attention is being directed to external protruberances, such as hood ornaments, door handles, luggage racks, side mounted rear view mirrors, and even the use of vinyl roof tops. These are being eliminated wherever possible, and if they cannot be eliminated, made as small and streamlined as possible.

For safety purposes, it is desirable to give the operator the widest possible rearward field of view, particularly in the city. The operator's rearward field of view may be increased by making the side mounted rearview mirror large, as exemplified by Mosby in U.S. Pat. No. 2,969,715, or using a small mirror with a convex surface as exemplified by West in U.S. Pat. No. 2,911,177. The U.S. patents to King, U.S. Pat. Nos. 3,104,274, Katulich 3,170,985 and Tobin, Jr., 3,389,952 are examples of convex rear view mirrors being used in combination with larger flat mirrors to enhance the rearward vision of the operator.

The use of large external mirrors by themselves or in combination with convex mirrors offer the best rearward view; however, at high speeds the aerodynamic drag of these large mirrors produce sufficient air drag to degrade the efficiency of the vehicle. A comparable rearward field of view can be obtained with a much smaller convex mirror; however, the images produced by the convex mirror are reduced in size and distort the operator's perspective as to distances between his vehicle and the other vehicle or object being observed. Therefore, a convex mirror by itself is unacceptable from a safety point of view.

Generally, a larger rearward field of view is desired in city driving where the streets are congested and vehicles change lanes quite rapidly. At the lower city driving speeds, aerodynamic drag caused by a large external rear view mirror is relatively small, since the drag is a function of the fourth power of the vehicle speed. On the highway where vehicles are moving at a much higher speed, the vehicles are spaced further apart, rapid lane changing is less prevalent therefore a smaller rear view mirror, with a reduced field of view, is acceptable. The smaller external rear view mirror creates less aerodynamic drag and improves the efficiency of the vehicle.

SUMMARY OF THE INVENTION

The invention is a city-highway external rear view mirror having a mirror housing rotatable between two fixed positions. The mirror housing contains a first mirror having a relatively large viewing area providing the vehicle operator with a relatively wide angle rearward field of view for city driving and a second smaller mirror having a reduced rearward field of view for highway driving. In the first fixed position of the mirror housing, the first mirror is viewable by the operator, and in the second fixed position, the second or smaller mirror is viewable by the operator. The mirror housing is shaped such that in the second position the aerodynamic drag of the mirror housing is minimized.

In alternate embodiments of the disclosed external rearview mirrors, the first and second mirrors may include a convex portion to increase the rearward field of view.

DESCRIPTION OF THE PREFERRED EMBODIMENT

Figure 1:
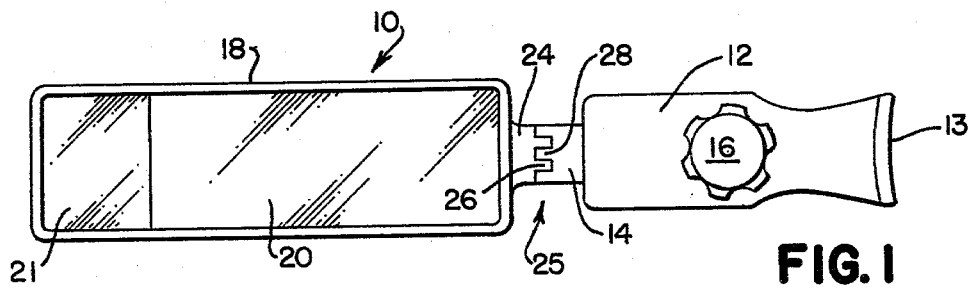
FIG. 1 is a frontal view of the external rear view mirror with the mirror assembly in the highway position.
Figure 2:
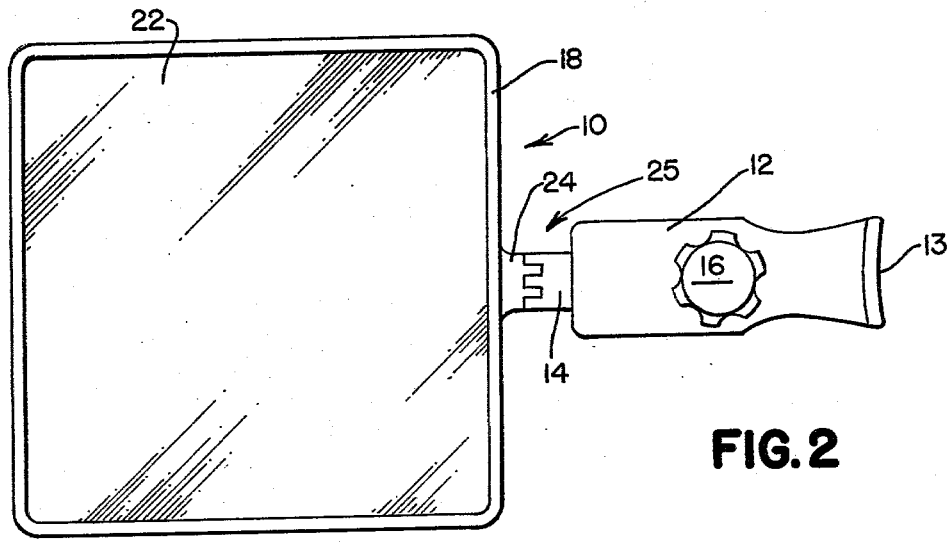
FIG. 2 is a frontal view of the external rear view mirror with the mirror assembly in the city position.
Figure 3:
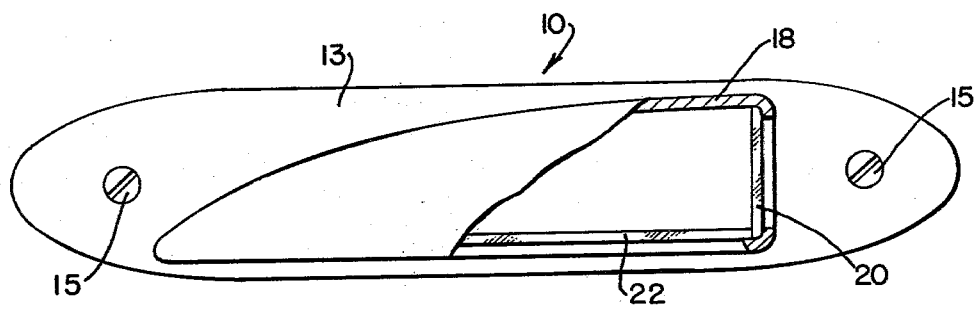
FIG. 3 is a side view of the external rear view mirror showing the relative position of the two mirrors.

The details of the city-highway rear view mirror are exemplified in FIGS. 1 and 2. FIG. 1 shows the rear view mirror in the highway position, while FIG. 2 shows the rear view mirror in the city position. FIG. 3 is a side view of the rear view mirror in the highway position of FIG. 1, looking from the left-hand side.

Referring first to FIGS. 1 and 2, the city-highway rear view mirror comprises a mirror assembly 10, a support housing 12, a pivotal member 14, an indexing mechanism 25, and a locking knob 16. The support housing 12 has a flange 13 adapted to be rigidly mounted to the body of the vehicle with a pair of screws 15. In the mounted position, the mirror assembly 10 is in full view of the operator through a window of the vehicle.

Figure 5:
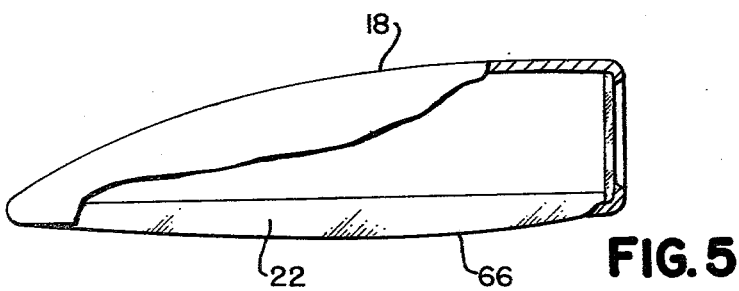
FIG. 5 is a side view of the mirror assembly showing an alternate arrangement between the two mirrors.

The mirror assembly 10 includes a mirror housing 18, a first mirror 20, a second mirror 22, and a boss 24. The second mirror 22 is mounted in the housing 18 at an angle to the first mirror 20. This angle may be 90 degrees, as shown in FIG. 3 or less than 90 degrees as shown in FIG. 5. The face of the boss 24 has a first portion of the indexing mechanism 25 comprising four equally spaced dogs 26 which mate with the second portion of the indexing mechanism comprising four corresponding dogs 28 on the face of the pivotal member 14 as shown. When the angle between the mirrors is less than 90 degrees, the indexing mechanism will permit the mirror assembly to be reindexed to a second position greater than 90 degrees such that the surface of mirror 22 will be locked in a plane parallel to the plan of mirror 20 in the first position. The first mirror 20 may or may not have a convex portion 21. As is known in the art, the convex portion 21 would give the operator a wider field of view.

Figure 4:
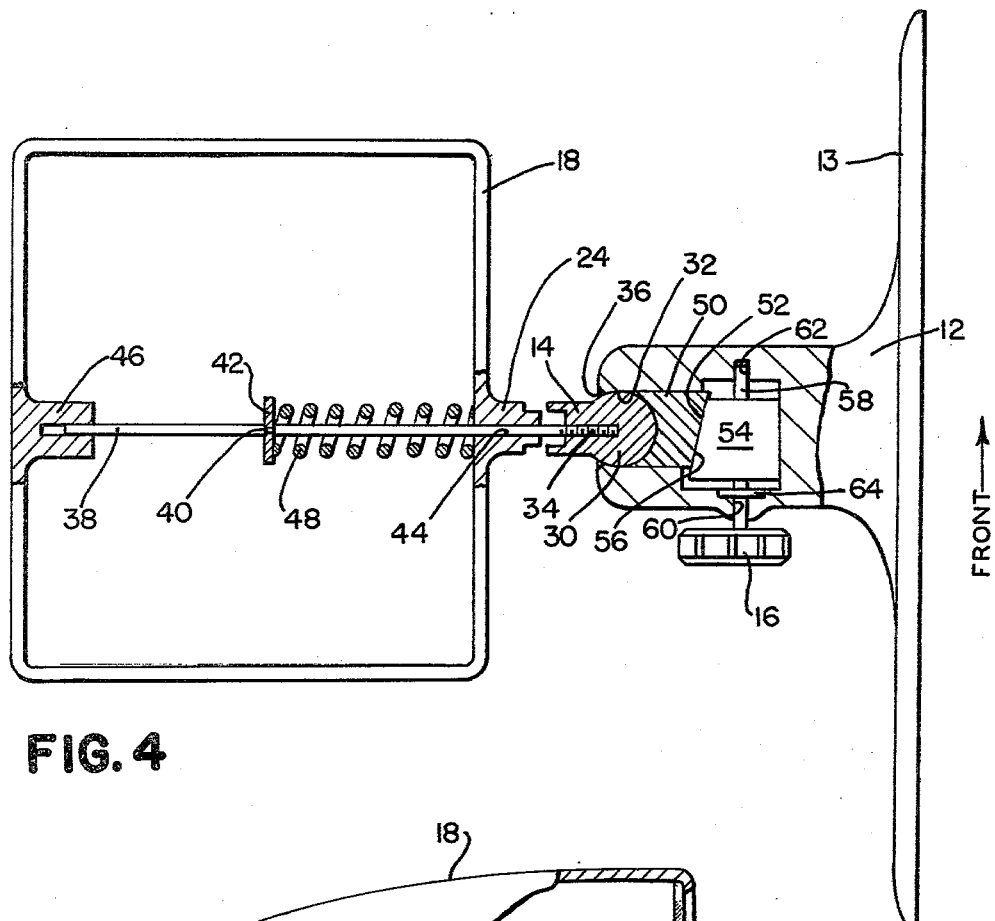
FIG. 4 is a cross sectional view of the external rear view mirror showing the details of pivotal member and locking mechanism.

The locking knob 16 activates a locking mechanism in the support housing 12 which locks the pivotal member 14 in a fixed position with respect to the support housing 12 as illustrated in FIG. 4. This permits the operator to adjust the position of the mirror assembly 10 affording him the desired rearward view, then lock the pivotal member 14. The mirror assembly 10, which is supported by the pivotal member, is thereby locked in the desired position.

Referring now to FIG. 3, there is shown a side view of the mirror assembly 10. The mirror housing 18 has a generally triangular, streamlined shape such that when disposed in the highway position it offers a low resistance to the air flow. The first mirror 20 is disposed in the mirror housing 18 at the base of the triangular configuration, and is viewable by the operator in the highway position. The second mirror 22 is disposed generally parallel to one leg of the triangular configuration at a right angle to mirror 20.

Further details of the city-highway rear view mirror are shown in the cross sectional view of FIG. 4. The pivotal member has a spherically shaped end 30 captivated in a mating internal hemispherical surface 32 of the support housing 12. A cylindrical section 34 of the pivotal member 14 protrudes through a clearance hole 36 of the support housing. The cylindrical section 34 has, on its end, the four corresponding dogs 28 comprising the second portion of the indexing mechanism 25. A shaft 38 is fixedly attached to the pivotal member 14 concentric with the cylindrical section 34. The shaft 38 may be an integral part of the pivotal member 14 or may be pressed into a mating bore or threaded into the pivotal member 14, as shown. The shaft 38 has a groove 40 intermediate its two ends which retains spring retainer member 42 such as a "C" washer. The shaft 38 passes through a first bore 44 formed through boss 24 and is slidably received in a second bore 46 on the opposite side of the mirror housing 18. A resilient member such as spring 48 is disposed about shaft 38 between the spring retainer member 42 and the inner surface of the housing 18 adjacent to boss 24. The spring 48 urges the housing 18 towards the pivotal member and holds the dogs 26 in engagement with dogs 28 locking the position of the housing 18 with respect to the pivotal member 14.

The locking mechanism disposed in the support housing comprises a locking wedge 50 having a first wedge surface 52 slidably disposed in the support housing 14 adjacent to the spherical end 30 of the pivotal member, and a drive wedge 54 having a second wedge surface 56 adjacent to the first wedge surface 52 movably disposed in the support housing. The driven wedge has a threaded bore receiving a threaded shaft 58 which passes through a bore 60 in the support housing on one side and received in a guide bore 62 on the opposite side. A retainer 64 restrains the threaded shaft 58 from lateral movement within the support housing 12. The locking knob 16 is fixedly attached to the end of the threaded shaft 58 protruding from the support housing.

Rotating the locking knob 16 in one direction displaces the driven wedge 54 forward, urging the locking wedge 50 towards the spherical end of the pivotal member 14 thereby clamping the spherical end of the pivotal member 14 between the locking wedge 50 and the internal hemispherical surface 32 of the support housing. To adjust the mirror assembly 10, the locking knob is rotated in the opposite direction relieving the clamping force on the spherical end of the pivotal member 14.

To rotate the mirror assembly from the city position to the highway position or vice versa, the operator pushes the mirror assembly outwardly to the left as shown in FIGS. 1 and 2 against the force of spring 48 until the dogs 26 on boss 24 disengage from the dogs 28 on the pivotal member as shown in FIG. 4. The mirror assembly is then rotated 90 degrees and released by the operator. Spring 48 displaces the mirror assembly 10 to the right towards the support housing 12 and the dogs 26 and 28 re-engage locking the mirror assembly in the rotated position. Because the first and second mirrors 20 and 22 are disposed at a right angle to each other and the configuration of the dogs only permits engagement at 90 degree intervals, the mirror assembly 10 need not be readjusted as a result of the rotation.

In city driving, the mirror assembly 10 is rotated such that the larger or second mirror 22 is viewed by the operator giving him a wide angle rearward view. For highway driving, the mirror assembly 10 is rotated such that the smaller or first mirror 20 is viewed by the operator. In this position, the mirror assembly 10 has a smaller cross section and the streamlined configuration has reduced aerodynamic drag at high speeds.

Figures 6, 7:
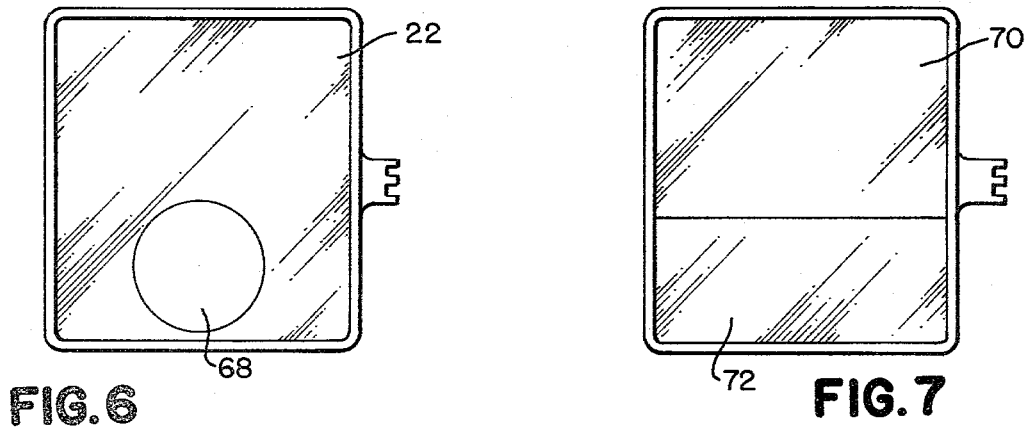
FIGS. 6 and 7 are frontal views of the rear view mirror in the city position showing alternate mirror configurations having convex portions.

As shown in FIG. 5, the large mirror 22 may have a slightly convex reflective surface 66, affording the operator a wide angle rearward view for city driving. Alternately, as shown on FIG. 6, the large mirror 22 may be flat as shown in FIG. 3 and include thereon a circular convex section 68, providing an enlarged rearward view when observed. In another version illustrated in FIG. 7, mirror 22 may have an upper flat section 70 and a slightly convex lower section 72 to give a wide rearward field of view. Obviously, the sections 70 and 72 may be reversed with the convex section 72 on top, and the flat section 70 on the bottom.

Figure 8:
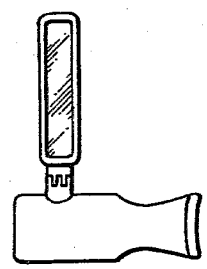
FIGS. 8 and 9 are frontal views of an alternate version of the rear view mirror rotatable about a vertical axis.
Figure 9:
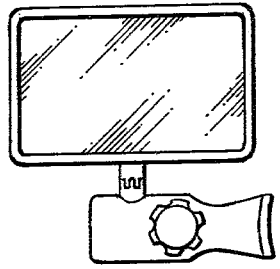

As illustrated on FIG. 8, the pivotal arm 14 may extend from the support housing 12 in a generally vertical direction rather than horizontally as shown in FIGS. 1 and 2. This configuration may be more advantageous in larger vehicles such as light trucks and vans. The 90 degree indexing means and locking mechanism would be similar to that shown with respect to FIGS. 4 and 5. Although specific 90 degree indexing and locking mechanisms are shown in the disclosed embodiments, it is not intended that the invention be limited to the embodiments shown. Those skilled in the art are well aware of other types of 90 degree indexing and locking mechanisms which are functionally equivalent to the mechanisms shown which may be used without departing from the spirit of the invention.

What is claimed is:

1. A city-highway rear view mirror having reduced aerodynamic drag for high speed highway operation of a vehicle comprising:

support means adapted to be rigidly mounted to an external surface of a vehicle;

a mirror assembly having a first mirror, a second mirror disposed at an angle to said first mirror, and an axis of rotation parallel to the surfaces of said first and second mirrors, said first mirror having a surface area substantially larger than the surface area of said second mirror; and indexing means rigidly supporting said mirror assembly from said support means for permitting said mirror assembly to be rotated about said axis between a city position with said first mirror disposed substantially normal to the vehicle's direction of motion and a highway position with said second mirror substantially normal to the vehicle's direction of motion to reduce the aerodynamic drag of the mirror during high speed highway operation of the vehicle.

2. The city-highway rear view mirror of claim 1 wherein said support means further includes:

a pivotal member connected to said indexing means providing a 4 degree freedom of movement between said indexing means and said support means; and means for restraining the movement of said pivotal member with respect to said support means.

3. The city-highway rear view mirror of claim 2 wherein said means for restraining is a locking mechanism for locking said pivotal member in a fixed position with respect to said support means.

4. The city-highway rear view mirror of claim 3 wherein said axis of rotation is generally horizontal with respect to the vehicle.

5. The city-highway rear view mirror of claim 3 wherein said axis of rotation is generally vertical with respect to the vehicle.

6. The city-highway rear view mirror of claim 1 wherein said second mirror has a convex reflective surface.

7. The city-highway rear view mirror of claim 1 wherein said second mirror has a first portion having a flat reflective surface and a second portion having a convex reflective surface.

8. The city-highway rear view mirror of claim 1 wherein said first mirror has a first portion having a flat reflective surface and a second portion having a convex reflective surface.

9. The city-highway rear view mirror of claim 1 wherein said mirror assembly includes a housing having a streamlined configuration to further reduce the aerodynamic drag of said mirror in said highway position.

* * * * *